(12) United States Patent
Morgan, Jr.

(10) Patent No.: US 12,247,654 B1
(45) Date of Patent: Mar. 11, 2025

(54) OIL FILTER FOR CONTINUOUSLY VARIABLE TRANSMISSION

(71) Applicant: Orrin Benjamin Morgan, Jr., Kalamazoo, MI (US)

(72) Inventor: Orrin Benjamin Morgan, Jr., Kalamazoo, MI (US)

( * ) Notice: Subject to any disclaimer, the term of this patent is extended or adjusted under 35 U.S.C. 154(b) by 55 days.

(21) Appl. No.: 16/822,588

(22) Filed: Mar. 18, 2020

Related U.S. Application Data (60) Provisional application No. 62/821,737, filed on Mar. 21, 2019.

(51) Int. Cl.
| | | |
|---|---|---|
| *F16H 57/04* | (2010.01) |
| *B01D 27/06* | (2006.01) |
| *B01D 29/21* | (2006.01) |
| *B01D 35/027* | (2006.01) |
| *F01M 1/10* | (2006.01) |
| *F16H 57/031* | (2012.01) |

(52) U.S. Cl.
CPC ......... *F16H 57/0404* (2013.01); *B01D 27/06* (2013.01); *B01D 29/21* (2013.01); *B01D 35/027* (2013.01); *F01M 1/10* (2013.01); *F16H 57/031* (2013.01); *B01D 2201/02* (2013.01); *B01D 2201/0415* (2013.01); *B01D 2201/304* (2013.01); *F01M 2001/105* (2013.01)

(58) Field of Classification Search
CPC .................................................. B01D 2201/02
See application file for complete search history.

(56) References Cited

U.S. PATENT DOCUMENTS 3,458,050 A * 7/1969 Cooper .................. B01D 35/02
210/493.2

OTHER PUBLICATIONS

David Crowley, "How long does transmission fluid last?" Yourmechanic.com https://www.yourmechanic.com/question/how-long-does-transmission-fluid-last Dec. 2, 2015.*

* cited by examiner

*Primary Examiner* — Benjamin M Kurtz
(74) *Attorney, Agent, or Firm* — Larry E. Henneman, Jr.; Henneman & Associates, PLC (57) ABSTRACT

A filter configured to replace an original filter disposed in a cavity in a transmission, increases fluid flow rate through the filter. An example filter includes a bottom structure configured to mate with the bottom portion of the cavity, and the bottom structure defines an outlet through which oil passes from the cavity to the outlet of the housing. The filter also includes a filter media having a bottom portion and an opposite top portion, the bottom portion being coupled to the bottom structure of the filter. In the example filter system, the outer diameter of the bottom portion of the filter media is greater than the outer diameter of the top portion of the filter media.

10 Claims, 7 Drawing Sheets

PRIOR ART

OIL FILTER FOR CONTINUOUSLY VARIABLE TRANSMISSION

RELATED APPLICATIONS

This application claims the benefit of priority of copending U.S. Provisional Patent Application No. 62/821,737 entitled "OIL FILTER FOR CONTINUOUSLY VARIABLE TRANSMISSION", filed on Mar. 21, 2019 by the same inventor, which is incorporated herein by reference in its entirety.

BACKGROUND OF THE INVENTION

Field of the Invention

Figure 1:
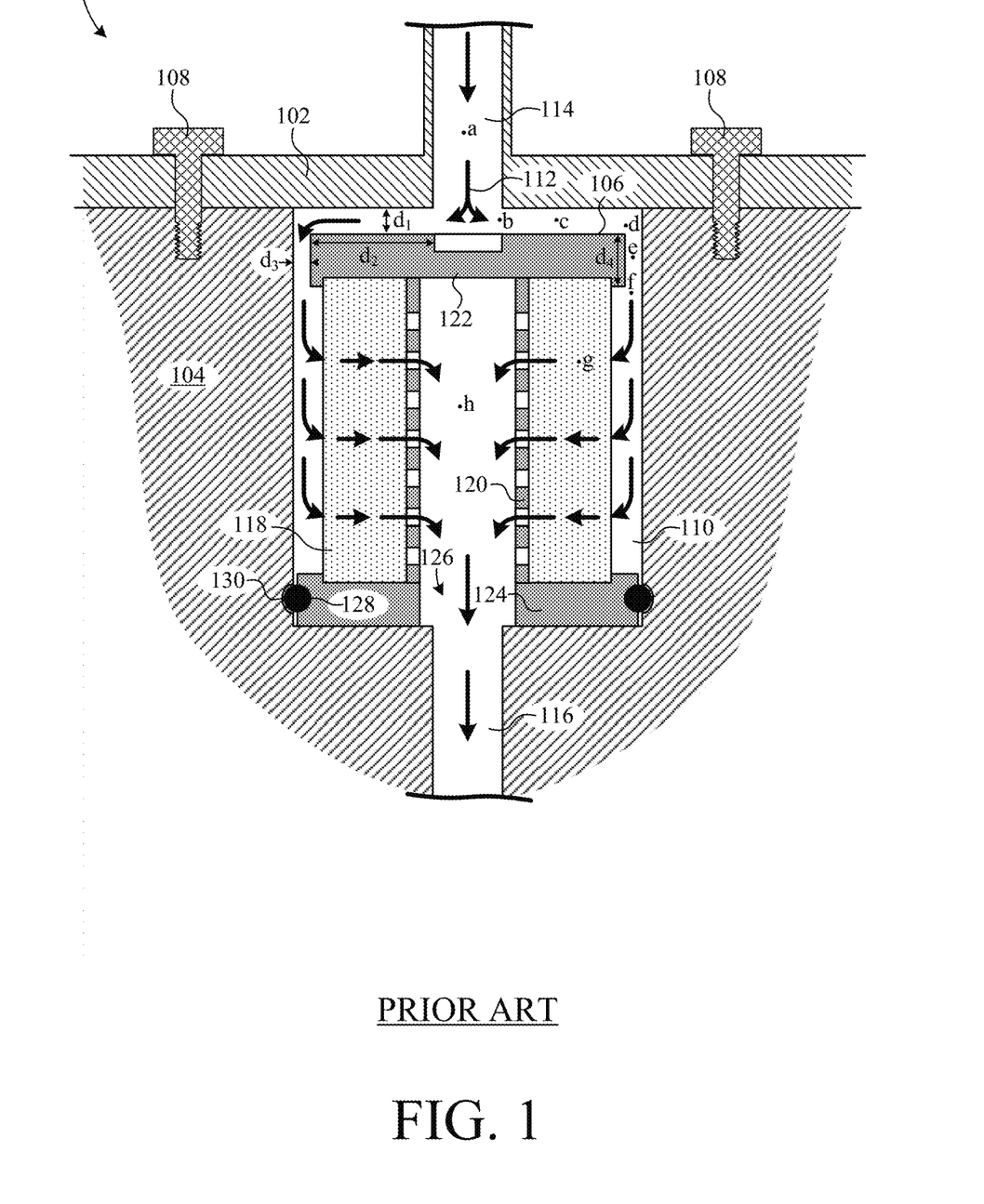
FIG. 1 shows a cross-sectional view of a prior art transmission filter disposed in a transmission cavity.

Continuously variable transmissions (CVTs) are currently being incorporated into a wide variety of vehicles. FIG. 1 shows a cross-sectional side view of a prior art CVT oil filter system 100. System 100 includes a cover 102, a transmission housing 104, and a filter 106. Cover 102 is mounted to housing 104 via a set of bolts 108 to seal filter 106 in a cylindrical cavity 110 formed in housing 104. Transmission oil 112 from the transmission flows through an inlet 114 formed in cover 102, enters cavity 110, passes through filter 106, and exits through an outlet 116 in housing 104, where it is returned back to the transmission as filtered working fluid.

Filter 106 is removably seated in cavity 110, so that it can be replaced during routine transmission maintenance. Filter 106 is generally cylindrical and includes a filter media 118 and a rigid frame 120 coupled between a first end structure 122 and a second end structure 124. Filter media 118 permits the flow of oil 112 therethrough, while capturing particulate debris. Frame 120 provides structural support between structures 122 and 124 and defines a number of apertures to facilitate oil flow therethrough. Second end structure 124 provides structural support to filter 106 and a passage 126, through which filtered oil leaves filter 106. Second end structure 124 also facilitates the seating of filter 106 in housing 104. As shown, an O-ring 128 is disposed around second end structure 124 to form a seal between second end structure 124 and housing 104. When filter 106 is disposed in cavity 110, O-ring 128 is seated in a channel 130 defined by the interior surface of cavity 110. Second end structure 124 provides structural support to filter 106 and is impermeable to fluid passage.

What is needed is a transmission system that does not suffer from premature failure.

SUMMARY

The present invention overcomes the problems associated with the prior art by providing a replacement filter having a design that increases the flow of transmission fluid through the filter. The invention facilitates the continued use of CVT transmissions that would be inoperable and/or performing poorly with an originally designed filter.

One major disadvantage of filter 106 is that it substantially impedes the flow of oil 112 through the transmission. This is particularly problematic in CVT's, which have a low tolerance to fluid pressure differentials across the filter inlet and outlet. For example, as debris accumulates in media 118, it impedes the overall flow through filter 106 and, therefore, increases the pressure differential between the inlet and the outlet. Because CVT's operate within a very narrow range of operating pressures, filter 106 has a very short life. Once the flow impedance reaches a certain level, the hosting vehicle experiences a variety of undesirable and dangerous effects including, but not limited to, jerking, bucking, etc. This is particular problematic as the vehicle ages because the range of pressure drop across filter 106 that will allow the transmission to work properly becomes smaller and smaller. Eventually, even new clean filters only last a few weeks. Such filters are so difficult and costly to access and change that many CVT transmissions have to be replaced while many of the internal components are still operating properly.

An example transmission oil filter system includes a transmission housing, a cover, and a filter removably disposed in the cavity. The transmission housing has an interior wall, defining a substantially cylindrical cavity, and a fluid outlet. The cavity has a top portion and a bottom portion, and the cavity is adapted to receive an oil filter. The fluid outlet is disposed at the bottom portion of the cavity to provide a passage through which oil exits the cavity. The cover is removably attached to the transmission housing over the top portion of the cavity, and the cover defines a fluid inlet through which oil enters the top portion of the cavity. In disclosed embodiments, the housing is a continuously variable transmission housing.

The filter includes a bottom structure configured to mate with the bottom portion of the cavity, and the bottom structure defines an outlet through which oil passes from the cavity to the outlet of the housing. The filter also includes a filter media having a bottom portion and an opposite top portion, the bottom portion being coupled to the bottom structure of the filter. In the example filter system, the outer diameter of the bottom portion of the filter media is greater than the outer diameter of the top portion of the filter media.

The filter can further include a top structure coupled to the top portion of the filter media, and the filter can further include a rigid frame coupled between the bottom structure and the top structure. The rigid frame facilitates the passage of filtered oil therethrough.

In an example filter, the filter media is tapered from the bottom portion of the filter media to the top portion of the filter media. The filter media is formed from a pliable material, and the pliable material is folded into a corrugated configuration. The pliable material is then shaped in a conical configuration.

In another example filter, the bottom portion of the filter media is configured into a first cylinder having a first diameter, and the top portion of the filter media is configured into a second cylinder having a second diameter. The first diameter is greater than the second diameter. In a particular example, the bottom portion of the filter media is formed from a first section of pliable material that is folded into a corrugated configuration, and the top portion of the filter media is formed from a second section of pliable material that is folded into corrugated configuration. The example filter can further include an annular plate having a top side, a bottom side, and an aperture passing through the top side of the annular plate and the bottom side of the annular plate. A top of the bottom portion of the filter media can bonded to the bottom side of the annular plate, and a bottom of the top portion of the filter media can bonded to the top side of the annular plate.

In another example transmission oil filter system, the filter media is a rigid, porous structure.

In another example transmission oil filter system, the bottom structure of the filter includes a radial outer surface. The radial outer surface of the bottom structure defines a channel, and the filter further includes a resilient gasket seated in the channel. The interior wall defining the bottom portion of the cylindrical cavity is adapted to urge against the resilient gasket, to form a fluid barrier between the bottom structure of the filter and the interior wall of the housing defining the cylindrical cavity.

Methods for installing a transmission filter are also disclosed. An example method includes, providing a transmission having a transmission housing, a cover, and a first filter. The transmission housing has an interior wall defining a substantially cylindrical cavity and a fluid outlet. The cavity has a top portion and a bottom portion, and the cavity is configured to receive an oil filter. The fluid outlet is disposed at the bottom portion of the cavity to provide a passage through which oil exits the cavity. The cover is removably attached to the transmission housing over the top portion of the cavity, and the cover defines a fluid inlet through which oil enters the top portion of the cavity. The first filter includes a bottom portion and a top portion, and the bottom portion is configured to seat within the cavity. The example method additionally includes providing a second filter, removing the cover from the housing, removing the first filter from the cavity, installing the second filter in the cavity, and reattaching the cover to the transmission housing over the cavity. The second filter has a bottom portion and a top portion. The bottom portion of the second filter includes a bottom structure configured to mate with the bottom portion of the cavity, and the top portion of the second filter has a diameter less than the diameter of the top portion of the first filter. Optionally, the second filter can also have a height that is less than a corresponding height of the first filter.

In a particular example method, the second filter includes a filter media having a top portion and a bottom portion. The top portion of the second filter includes a top structure attached to the top portion of the filter media. The second filter further includes a rigid frame coupled between the bottom structure and the top structure, and the rigid frame facilitates the passage of oil therethrough. The filter media can be tapered to narrow from the bottom portion of the filter media to the top portion of the filter media. The filter media can formed from a pliable material, which is folded into a corrugated configuration, and the pliable material can be shaped in a conical configuration.

In another example method, the bottom portion of the filter media is configured into a first cylinder having a first diameter, and the top portion of the filter media is configured into a second cylinder having a second diameter. The first diameter of the bottom portion of the filter media is greater than the second diameter of the top portion of the filter media. The bottom portion of the filter media can be formed from a first section of pliable material that is folded into a corrugated configuration, and the top portion of the filter media can be formed from a second section of pliable material that is folded into corrugated configuration. The second filter can further include an annular plate having a top side, a bottom side, and an aperture passing through the top side of the annular plate and the bottom side of the annular plate. A top of the bottom portion of the filter media can be bonded to the bottom side of the annular plate, and a bottom of the top portion of the filter media can be bonded to the top side of the annular plate.

Optionally, the second filter can include a filter media that is a rigid, porous structure.

In example methods, the bottom structure of the second filter includes a radial outer surface, and the radial outer surface of the bottom structure defines a channel. The second filter further includes a resilient gasket seated in the channel. The interior wall defining the bottom portion of the cylindrical cavity is configured to urge against the resilient gasket to form a fluid barrier between the bottom structure of the second filter and the interior wall of the housing defining the cylindrical cavity.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a transmission filter system that alleviates premature filter failure. In the following description, numerous specific details are set forth (e.g., structural materials, filter media materials, etc.) in order to provide a thorough understanding of the invention. Those skilled in the art will recognize, however, that the invention may be practiced apart from these specific details. In other instances, details of well-known filter manufacturing practices (e.g., molding, assembly, bonding, etc.) and components have been omitted, so as not to unnecessarily obscure the present invention.

In view of the prior art CVT filter shortcomings, the inventor has developed a novel transmission filter having a substantially longer life without sacrificing filtration performance. Upon detailed analysis of prior art system 100 of FIG. 1, the inventor has found that there are various flow impeding characteristics of filter 106 that contribute to its poor performance. Such characteristics contribute to major pressure losses, minor pressure losses, and pressure losses due to the flow impedance of media 118. These irreversible losses accumulate along the fluid path around and through filter 106. That is, $$P_{loss} = \Sigma P_{minor} + \Sigma P_{major} + P_{media\ loss}$$

where, $P_{loss}$ is the total irreversible pressure loss, $P_{minor}$ are minor irreversible pressure losses and are calculated by $$P_{minor} = K \cdot \frac{\rho V^2}{2g} \tag{1}$$

and, $P_{major}$ are major irreversible pressure losses calculated by $$P_{major} = \frac{fL}{D} \cdot \frac{\rho V^2}{2g} \quad (2)$$

and, $P_{media\ loss}$ are irreversible pressure losses that occur as the oil passes through media 118 where,
P=fluid pressure g=acceleration of gravity
K=loss coefficient f=friction factor of the fluid path walls
ρ=fluid density L=fluid path length
V=fluid velocity D=distance between walls bounding fluid path Consider the flow path from point-a in inlet 114 to point-h inside filter 106. First, as the oil from inlet 114 impacts the top of first end structure 122, it is redirected 90 degrees at point-b, thereby resulting in a first minor loss represented by $$P_{minor(b)} = K_{90°} \cdot \frac{\rho V_b^2}{2g}$$

where,
$K_{90°}$ is the loss coefficient for a 90 degree turn in the fluid path.

Next, as oil from point-b moves to point-c, a first major pressure loss occurs and is represented by $$P_{major(c)} = \frac{fL}{D} \cdot \frac{\rho V_c^2}{2g} = \frac{f_1 \cdot d_2}{d_1} \cdot \frac{\rho V_c^2}{2g}$$

where
$f_1$ is the friction factor between the walls of cover 102 and first end structure 122.

Then, at point-d, the oil impacts the inside wall of cavity 110 and takes another 90 degree turn, thereby resulting in a second minor loss represented by $$P_{minor(d)} = K_{90°} \cdot \frac{\rho V_d^2}{2g}.$$

Next, as oil from point-d moves to point-f, a second major pressure loss occurs and is represented by $$P_{major(e)} = \frac{fL}{D} \cdot \frac{\rho V_e^2}{2g} = \frac{f_2 \cdot d_4}{d_3} \cdot \frac{\rho V_e^2}{2g}$$

where,
$f_2$ is the friction factor between the interior walls of cavity 110 and first end structure 122.

Then, at point-f, the oil takes another 90 degree turn before entering media 118, thereby resulting in a second minor loss represented by $$P_{minor(f)} = K_{90°} \cdot \frac{\rho V_f^2}{2g}.$$

From this it can be seen that the total irreversible pressure loss along the fluid path between point-a and point-h can be represented by $$P_{loss} = \sum P_{minor} + \sum P_{major}$$

$$P_{loss} = P_{minor(b)} + P_{minor(d)} + P_{minor(f)} + P_{major(c)} + P_{major(e)}$$

$$P_{loss} = K_{90°} \cdot \frac{\rho V_b^2}{2g} + K_{90°} \cdot \frac{\rho V_d^2}{2g} + K_{90°} \cdot \frac{\rho V_f^2}{2g} + \frac{f_1 \cdot d_2}{d_1} \cdot \frac{\rho V_c^2}{2g} + \frac{f_2 \cdot d_4}{d_3} \cdot \frac{\rho V_e^2}{2g}$$

After rigorous testing of the prior art system 100, the inventor has found that such losses cause the hosting transmission to fail prematurely. In particular, the prior art design provides sufficient fluid flow for a new transmission, but not for a transmission that has been "broken in".

Figure 2:
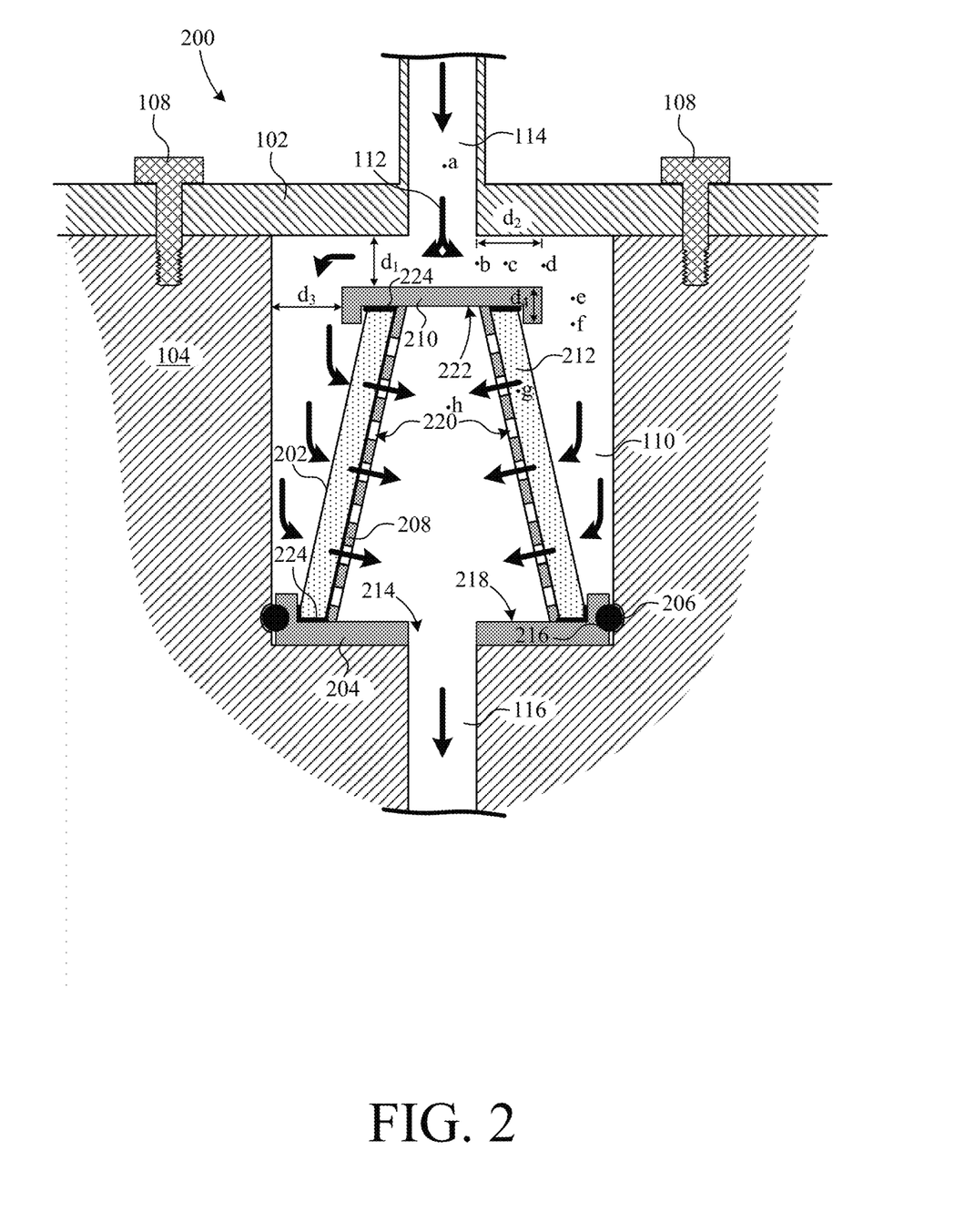
FIG. 2 shows a cross-sectional view of an improved transmission filter disposed in the transmission cavity of FIG. 1.

To address the inadequate fluid flow, the inventor has developed a novel replacement CVT filter system 200, which is shown in a cross-sectional side view in FIG. 2. System 200 includes a filter 202 disposed in cavity 110 of housing 104 to filter transmission oil 112. Filter 202 includes a bottom structure 204, a gasket 206, a frame 208, a top structure 210, and a filter media 212.

Bottom structure 204 is an annular, rigid structure formed from plastic but may also be formed from any other suitable material such as, for example, metal. Bottom structure 204 defines an aperture 214, a channel 216, and a recess 218. Aperture 214 provides a passage through which filtered oil 112 exits filter 202. Channel 216 extends completely around the radial outer surface of structure 204 and provides a seat for gasket 206. Recess 218 is a cylindrical recess formed on the top surface of bottom structure 204 and is configured to seat the bottom end of filter media 212.

Gasket 206 is a resilient O-ring that is seated in channel 216 to provide a fluid barrier between the interior walls of cavity 110 and bottom structure 204.

Frame 208 is a rigid structure that is fixed to bottom structure 204 and top structure 210 to provide structural support therebetween. Furthermore, frame 208 provides structural support to filter media 212, which can lose some of its rigidity when it becomes saturated with oil. Frame 208 also includes a plurality of apertures 220, which provide passages through which filtered oil enters the interior of filter 202. In this example, frame 208 is substantially conical but may alternately be cylindrical or any other useful shape.

Top structure 210 is an annular, rigid structure formed from plastic but may also be formed from any other suitable material such as, for example, metal. Top structure 210 defines a cylindrical recess 222, which is formed on the bottom surface of structure 210 and configured to receive the top end of filter media 212. Bottom structure 204, frame 208, and top structure 210 may be integral parts of a single monolithic structure formed, for example, by injection molding plastic. Alternately, they may be individual parts bonded together by some suitable means (e.g., glue, thermal weld, etc.) to form a single rigid body.

Filter media 212 filters transmission oil passing therethrough. In this example, filter media 212 is formed from a section of thin, pliable material that is folded into a corrugated (e.g., fan-fold) configuration and disposed about frame 208 in a conical configuration (e.g., compressed more at the top than at the bottom). The bottom and top ends of filter media 212 are bonded to bottom structure 204 and top structure 210, respectively, by and adhesive 224, to prevent unfiltered oil from bypassing filter media 212.

As compared to prior art filter 106, filter 202 (in combination with cavity 110) presents a much lower resistance to oil flow therethrough, because irreversible major and minor pressure losses are substantially reduced. This can be seen by analyzing such losses along the flow path of oil 112 as it moves from inlet 114 to outlet 116. That is, such losses are represented by $$P_{loss} = \Sigma P_{minor} + \Sigma P_{major}$$

Consider the flow path from point-a in inlet 114 to point-h in filter 202. First, as the oil from inlet 114 impacts the top surface of structure 204, it is redirected 90 degrees at point-b, thereby resulting in a first minor loss $P_{minor(b)}$ represented by $$P_{minor(b)} = K_{90°} \cdot \frac{\rho V_b^2}{2g}$$

Such loss is approximately the same for both filters 106 and 202 at point-b because both have approximately the same loss coefficient $K_{90°}$, fluid density $\rho$, fluid velocity $V_b$, and gravity g.

Next, as oil from point-b moves to point-c in filter 202, a first major pressure loss occurs and is represented by $$P_{major(c)} = \frac{fL}{D} \cdot \frac{\rho V_c^2}{2g} = \frac{f_1 \cdot d_2}{d_1} \cdot \frac{\rho V_c^2}{2g}$$

Because $d_1$ for filter 202 is greater than $d_1$ (headspace) for filter 106, $d_2$ for filter 202 is less than $d_2$ for filter 106, and $V_c$ for filter 202 is less than $V_c$ for filter 106, the overall $P_{major(c)}$ for filter 202 is less than the $P_{major(c)}$ for filter 106. Of course, friction factor $f_1$ and gravity g are the same values in both filters 202 and 106.

Then, at point-d, the oil impacts the inside wall of cavity 110 and takes another 90 degree turn in filter 202, thereby resulting in a second minor loss represented by $$P_{minor(d)} = K_{90°} \cdot \frac{\rho V_d^2}{2g}$$

Although loss coefficient $K_{90°}$, fluid density $\rho$, and gravity g are the same values for both filters 202 and 106, $V_d$ for filter 202 is less than $V_d$ for filter 106. This is because the flow path height $d_1$ for filter 202 is greater than the flow path height $d_1$ for filter 106. As a result, $P_{minor(d)}$ for filter 202 is less than $P_{minor(d)}$ for filter 106.

Next, as oil from point-d moves to point-f in filter 202, a second major pressure loss occurs and is represented by $$P_{major(e)} = \frac{fL}{D} \cdot \frac{\rho V_e^2}{2g} = \frac{f_2 \cdot d_4}{d_3} \cdot \frac{\rho V_e^2}{2g}$$

Because $d_3$ for filter 202 is greater than $d_3$ for filter 106, $d_4$ for filter 202 is less than $d_4$ for filter 106, and $V_e$ for filter 202 is less than $V_e$ for filter 106, the overall $P_{major(e)}$ for filter 202 is less than the $P_{major(e)}$ for filter 106. Of course, friction factor $f_2$ and gravity g are the same values in both filters 202 and 106.

Finally, at point-f in filter 202, the oil takes an approximate 45 degree turn before entering media 212, thereby resulting in a second minor loss represented by $$P_{minor(f)} = K_{60°} \cdot \frac{\rho V_f^2}{2g}$$

Because filter media 212 is pitched at an angle (e.g. 60 degrees), the oil requires less redirection and suffers less of an irreversible pressure loss. That is, $K_{60°}$ for filter 202 is less than $K_{90°}$ for filter 106.

In summary, it is shown that $P_{major(c)}$, $P_{minor(d)}$, $P_{major(e)}$, and $P_{minor(f)}$ are all less in filter 202, as compared to prior art filter 106. As a result, the overall irreversible pressure losses caused by filter 202 are much less than those caused by filter 106. Through experimentation, the inventor has found that by replacing prior art filter 106 with filter 202, the hosting transmission no longer exhibited the symptoms of bucking and jerking.

Another way of thinking about the improvement provided by filter 202, as compared to prior art filter 106, is that the cross sectional area of the fluid flow path is expanded at different points by the geometry of filter 202, and, for a constant supply pressure, a bigger "pipe" delivers more fluid. Above top structure 210, the cross sectional area of the fluid path is essentially the side surface area of a right circular cylinder of height $d_1$ (i.e., $2\pi r d_1$). Because d1 for filter 202 is much larger than d1 for the prior art filter 106, the cross sectional area of the fluid flow path (for any given radius (r)) is much larger for filter 202. Similarly, adjacent top structure 210 (e.g., at point-e), the cross sectional area of the fluid flow path is an annulus. Without doing the math, it should be readily apparent that the annular area surrounding top structure 210 (FIG. 2) is significantly greater than the annular area surrounding first structure 122 of filter 106.

Figure 3:
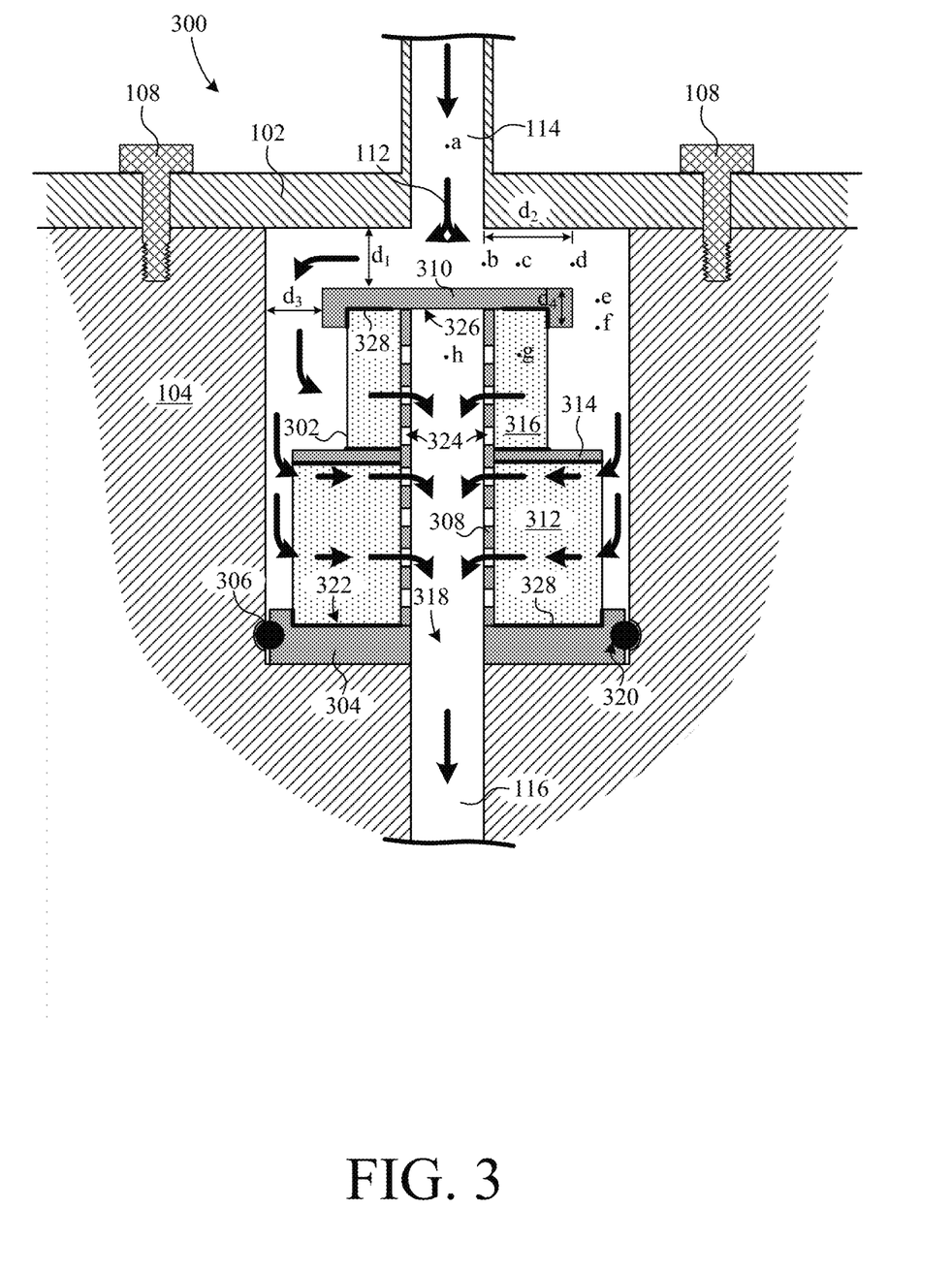
FIG. 3 shows a cross-sectional view of another improved transmission filter disposed in the transmission cavity of FIG. 1.

FIG. 3 shows a cross-sectional view of a transmission oil filter system 300, according to another embodiment of the invention. System 300 includes a filter 302 disposed in cavity 110 of housing 104 to filter transmission oil 112. Filter 302 includes a bottom structure 304, a gasket 306, a frame 308, a top structure 310, a first media portion 312, an intermediate plate 314, and a second media portion 316.

Structure 304 is an annular, rigid structure formed from plastic but may also be formed from any other suitable material such as, for example, metal. Structure 304 defines an aperture 318, a channel 320, and a recess 322. Aperture 318 provides a passage through which filtered oil 112 exits filter 302. Channel 320 extends completely around the radial outer surface of structure 304 to seat gasket 306. Recess 322 is a cylindrical recess formed on the top surface of structure 304 to seat the bottom end of first media portion 312. As indicated by the thick black line, the bottom end of first media portion 312 is adhered to the top surface of structure 304.

Gasket 306 is a resilient O-ring that is seated in channel 320 to provide a fluid barrier between the interior walls of cavity 110 and structure 304.

Frame 308 is a rigid structure that is fixed to structures 304 and 310 to provide structural support therebetween. Furthermore, frame 308 provides structural support to first media portion 312 and second media portion 316. Frame 308 also includes a plurality of apertures 324, which provide passages through which filtered oil enters the interior of filter 302. In this example, frame 308 is substantially cylindrical.

Top structure 310 is an annular, rigid structure formed from plastic but may also be formed from any other suitable material such as, for example, metal. Top structure 310 defines a cylindrical recess 326 formed on the bottom surface of top structure 310, which is configured to receive the top end of first media portion 312. Structure 304, frame 308, and structure 310 may be integral parts of a single monolithic structure formed, for example, by injection molding plastic. Alternately, they may be individual parts bonded together by some suitable means (e.g., glue, thermal weld, etc.) to form a single rigid body.

First media portion 312 filters transmission oil passing therethrough. In this example, first media portion 312 is formed from a section of thin, pliable material that is folded into a corrugated configuration and disposed about frame 308 in a cylindrical configuration. The bottom and top ends of first media portion 312 are bonded to structure 304 and plate 314, respectively, by an adhesive 328 to prevent unfiltered oil from bypassing first media portion 312.

Intermediate plate 314 is an annular disk-shaped structure bonded between first media portion 312 and second media portion 316 to prevent oil from bypassing therebetween.

Second media portion 316 filters transmission oil passing therethrough. In this example, second media portion 316 is formed from a second section of thin, pliable material that is folded into a corrugated configuration and disposed about frame 308 in a cylindrical configuration. The top and bottom ends of second media portion 316 are bonded to structure 310 and plate 314, respectively, by adhesive 328 to prevent unfiltered oil from bypassing second media portion 316.

As shown, the outer diameter of second media portion 316 is substantially less than the outer diameter of first media portion 312. As compared to prior art filter 106, filter 302 has a much lower resistance to oil flow therethrough because irreversible major and minor pressure losses are substantially reduced. This can be seen by analyzing such losses along the flow path of oil 112 as it moves from inlet 114 to outlet 116. That is, such losses are represented by $$P_{loss} = \Sigma P_{minor} + \Sigma P_{major}$$

Consider the flow path from point-a in inlet 114 to point-h in filter 302. First, as the oil from inlet 114 impacts the top surface of structure 310, it is redirected 90 degrees at point-b, thereby resulting in a first minor loss $P_{minor(b)}$ represented by $$P_{minor(b)} = K_{90°} \cdot \frac{\rho V_b^2}{2g}$$

Such loss is approximately the same for both filters 106 and 302 at point-b because both have approximately the same loss coefficient $K_{90°}$, fluid density $\rho$, fluid velocity $V_b$, and gravity g.

Next, as oil from point-b moves to point-c in filter 302, a first major pressure loss occurs and is represented by $$P_{major(c)} = \frac{fL}{D} \cdot \frac{\rho V_c^2}{2g} = \frac{f_1 \cdot d_2}{d_1} \cdot \frac{\rho V_c^2}{2g}$$

Because $d_1$ for filter 302 is greater than $d_1$ for filter 106, $d_2$ for filter 302 is less than $d_2$ for filter 106, and $V_c$ for filter 302 is less than $V_c$ for filter 106, the overall $P_{major(c)}$ for filter 302 is less than the $P_{major(c)}$ for filter 106. Of course, friction factor $f_1$ and gravity g are the same values in both filters 302 and 106.

Then, at point-d, the oil impacts the inside wall of cavity 110 and takes another 90 degree downward turn in filter 302, thereby resulting in a second minor loss represented by $$P_{minor(d)} = K_{90°} \cdot \frac{\rho V_d^2}{2g}$$

Although loss coefficient $K_{90°}$, fluid density $\rho$, and gravity g are the same values for both filters 302 and 106, $V_d$ for filter 302 is less than $V_d$ for filter 106. This is because the flow path height $d_1$ for filter 302 is greater than the flow path height $d_1$ for filter 106. As a result, $P_{minor(d)}$ for filter 302 is less than $P_{minor(d)}$ for filter 106.

Next, as oil from point-d moves to point-f in filter 302, a second major pressure loss occurs and is represented by $$P_{major(e)} = \frac{fL}{D} \cdot \frac{\rho V_e^2}{2g} = \frac{f_2 \cdot d_4}{d_3} \cdot \frac{\rho V_e^2}{2g}$$

Because $d_3$ for filter 302 is greater than $d_3$ for filter 106, $d_4$ for filter 302 is less than $d_4$ for filter 106, and $V_e$ for filter 302 is less than $V_e$ for filter 106, the overall $P_{major(e)}$ for filter 302 is less than the $P_{major(e)}$ for filter 106. Of course, friction factor $f_2$ and gravity g are the same values in both filters 302 and 106.

Finally, at point-f in filter 302, the oil takes an approximate 90 degree turn before entering media portion 316, thereby resulting in a second minor loss which is approximately the same loss encountered with filter 106.

In summary, it is shown that $P_{major(c)}$, $P_{minor(d)}$, and $P_{major(e)}$, are all less in filter 302 as compared to prior art filter 106. As a result, the overall irreversible pressure losses in filter 302 are much less than that of filter 106. Through experimentation, the inventor has found that by replacing prior art filter 106 with filter 302, the hosting transmission no longer exhibited the symptoms of bucking and jerking.

Figure 4:
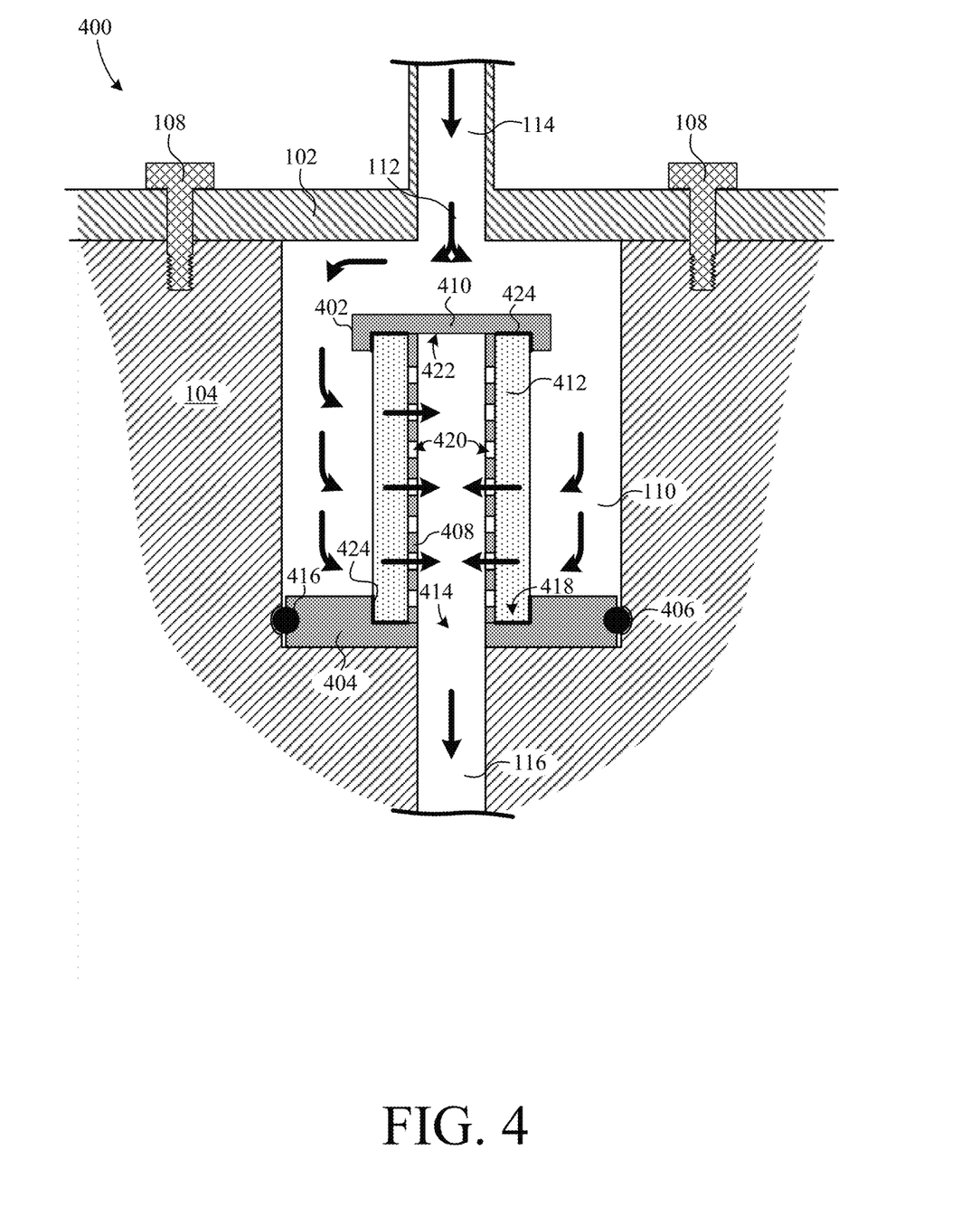
FIG. 4 shows a cross-sectional view of another improved transmission filter disposed in the transmission cavity of FIG. 1.

FIG. 4 shows a cross-sectional view of a system 400 according to an alternate embodiment of the invention. System 400 includes a filter 402 disposed in cavity 110 of housing 104 to filter transmission oil 112. Filter 402 includes a bottom structure 404, a gasket 406, a frame 408, a top structure 410, and a filter media 412.

Structure 404 is an annular, rigid structure formed from plastic but may also be formed from any other suitable material such as, for example, metal. Structure 404 defines an aperture 414, a channel 416, and a recess 418. Aperture 414 provides a passage through which filtered oil 112 exits filter 402. Channel 416 extends completely around the radial outer surface of structure 404 to seat gasket 406. Recess 418 is a cylindrical recess formed on the top surface of structure 404 to seat the bottom end of filter media 412.

Gasket 406 is a resilient O-ring that is seated in channel 416 to provide a fluid barrier between the interior walls of cavity 110 and structure 404.

Frame 408 is a rigid structure that is fixed to structures 404 and 410 to provide structural support therebetween. Furthermore, frame 408 provides structural support to filter media 412. Frame 408 also includes a plurality of apertures 420, which provide passages through which filtered oil enters the interior of filter 402. In this example, frame 408 is substantially cylindrical.

Structure 410 is an annular, rigid structure formed from plastic but may also be formed from any other suitable material such as, for example, metal. Structure 410 defines a cylindrical recess 422 formed on the bottom surface of structure 410 to receive the top end of filter media 412. Structure 404, frame 408, and structure 410 may be integral parts of a single monolithic structure formed, for example, by injection molding plastic. Alternately, they may be individual parts bonded together by some suitable means (e.g., glue, thermal weld, etc.) to form a single rigid body.

Filter media 412 filters transmission oil passing therethrough. In this example, filter media 412 is formed from a section of thin, pliable material that is folded into a corrugated configuration and disposed about frame 408 in a cylindrical configuration. The bottom and top ends of filter media 412 are bonded to structures 404 and 410, respectively, by and adhesive 424 to prevent unfiltered oil from bypassing filter media 412.

As shown, $d_1$ and $d_3$ with filter 402 are substantially larger than $d_1$ and $d_3$, respectively, with filter 106. As a result, the flow path between the interior walls of cavity 110 and the exterior surface of filter 106 are substantially less restricting to oil flow.

Figure 5:
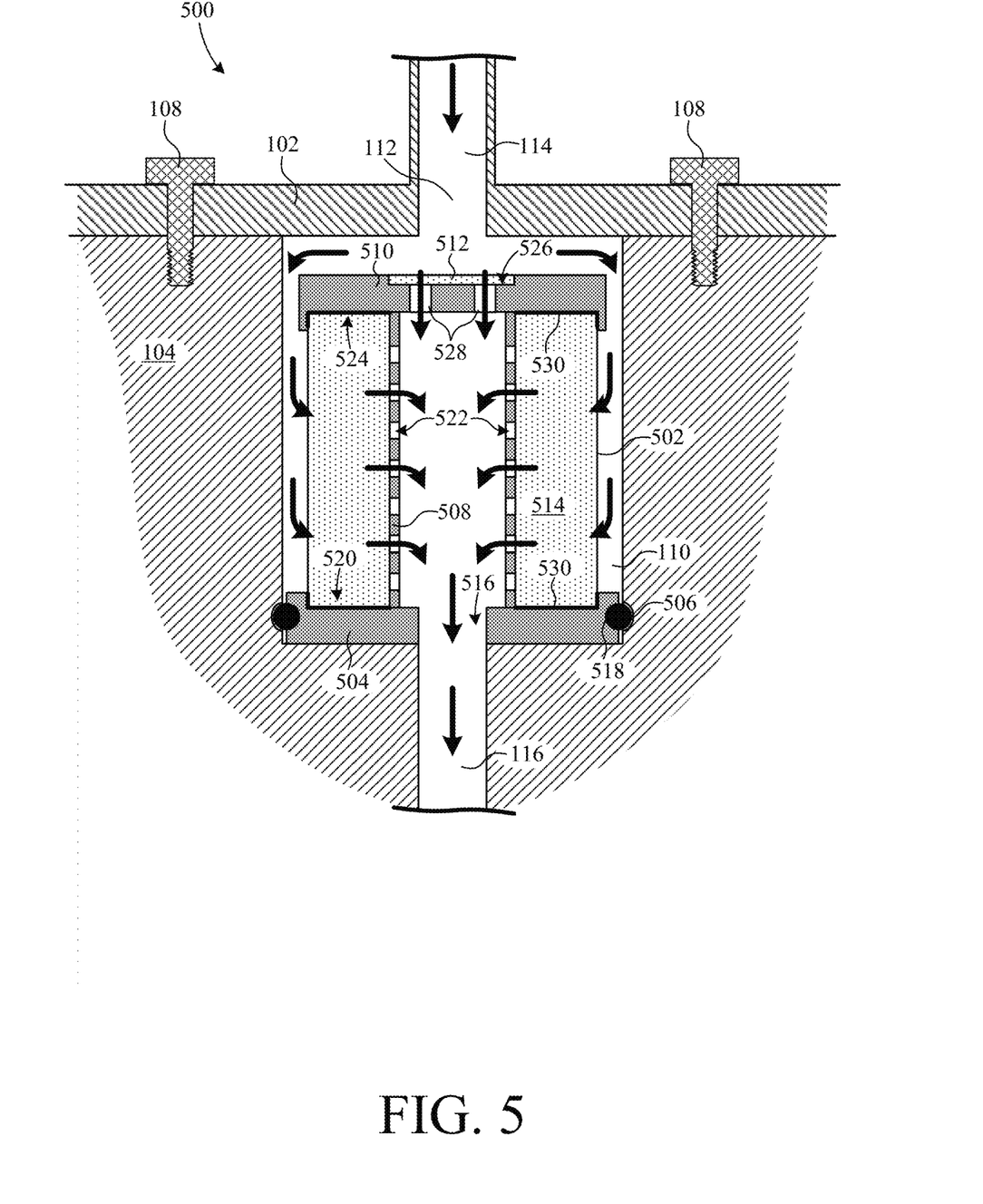
FIG. 5 shows a cross-sectional view of yet another improved transmission filter disposed in the transmission cavity of FIG. 1.

FIG. 5 shows a cross-sectional view of a system 500 according to an alternate embodiment of the invention. System 500 includes a filter 502 disposed in cavity 110 of housing 104 to filter transmission oil 112. Filter 502 includes a bottom structure 504, a gasket 506, a frame 508, a top structure 510, a first media portion 512, and a second media portion 514.

Structure 504 is an annular, rigid structure formed from plastic but may also be formed from any other suitable material such as, for example, metal. Structure 504 defines an aperture 516, a channel 518, and a recess 520. Aperture 516 provides a passage through which filtered oil 112 exits filter 502. Channel 518 extends completely around the radial outer surface of structure 504 to seat gasket 506. Recess 520 is a cylindrical recess formed on the top surface of structure 504 to seat the bottom end of first media portion 512.

Gasket 506 is a resilient O-ring that is seated in channel 518 to provide a fluid barrier between the interior walls of cavity 110 and bottom structure 504.

Frame 508 is a rigid structure that is fixed to structures 504 and 510 to provide structural support therebetween. Furthermore, frame 508 provides structural support to second media portion 514. Frame 508 also includes a plurality of apertures 522, which provide passages through which filtered oil enters the interior of filter 502. In this example, frame 508 is substantially cylindrical.

Top structure 510 is an annular, rigid structure formed from plastic but may also be formed from any other suitable material such as, for example, metal. The bottom surface of top structure 510 defines a cylindrical recess 524 that receives the top end of second media portion 514. The top surface of top structure 510 defines a smaller cylindrical recess 526 that seats media portion 512. Top structure 510 further includes a set of apertures 528 through which oil filtered by media portion 512 enters into filter 502. In this example embodiment, more than two apertures 528 are arranged in a circular array, but only two of apertures 528 are visible in the cross-sectional view of FIG. 5. Apertures 528 reduce the overall resistance to oil flow through filter 502 by providing additional flow paths, thereby increasing the total cross-sectional area of the flow path through filter 502. Top structure 510, frame 508, and structure 504 may be integral parts of a single monolithic structure formed, for example, by injection molding plastic. Alternately, they may be individual parts bonded together by some suitable means (e.g., glue, thermal weld, etc.) to form a single rigid body.

Media portion 512 is formed from a section of thin, pliable material that is cut into a cylindrical disk shape. Media portion 512 is also seated and bonded into recess 526 to filter oil passing through apertures 528.

Media portion 514 filters transmission oil passing therethrough. In this example, media portion 512 is formed from a section of thin, pliable material that is folded into a corrugated configuration and disposed about frame 508 in a cylindrical configuration. The bottom and top ends of media portion 514 are bonded to structures 504 and 510, respectively, by and adhesive 530 to prevent unfiltered oil from bypassing media portion 514.

Figure 6:
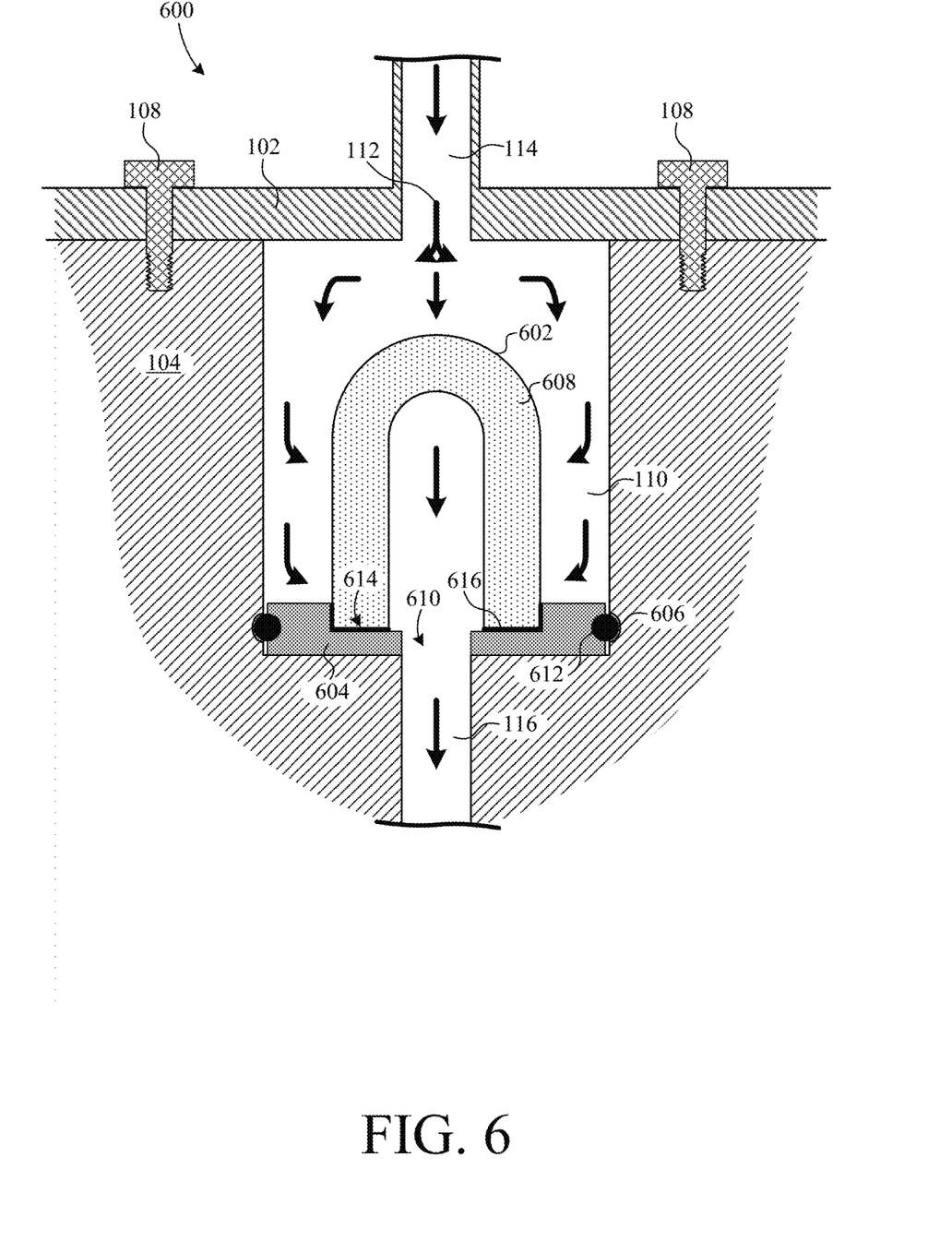
FIG. 6 shows a cross-sectional view of yet another improved transmission filter disposed in the transmission cavity of FIG. 1.

FIG. 6 shows a cross-sectional view of yet another alternate example system 600. System 600 includes a filter 602 disposed in cavity 110 of housing 104 to filter transmission oil 112 (represented by dark arrows). Filter 602 includes a bottom structure 604, a gasket 606, and a filter media 608.

Bottom structure 604 is an annular, rigid structure formed from plastic but may also be formed from any other suitable material such as, for example, metal. Bottom structure 604 defines an aperture 610, a channel 612, and a recess 614. Aperture 610 provides a passage through which filtered oil 112 exits filter 602. Channel 612 extends completely around the radial outer surface of bottom structure 604 to seat gasket 606. Recess 614 is a cylindrical recess formed on the top surface of bottom structure 604 to seat the bottom end of filter media 608.

Gasket 606 is a resilient O-ring that is seated in channel 612 to provide a fluid barrier between the interior walls of cavity 110 and structure 604.

Filter media 608 is a porous, rigid, monolithic member. The porosity of media 608 is such that media 608 is pervious to oil flow yet also collects small contaminants from oil passing therethrough. The bottom surface of media 608 is bonded to structure 604 via an adhesive 616.

Figure 7:
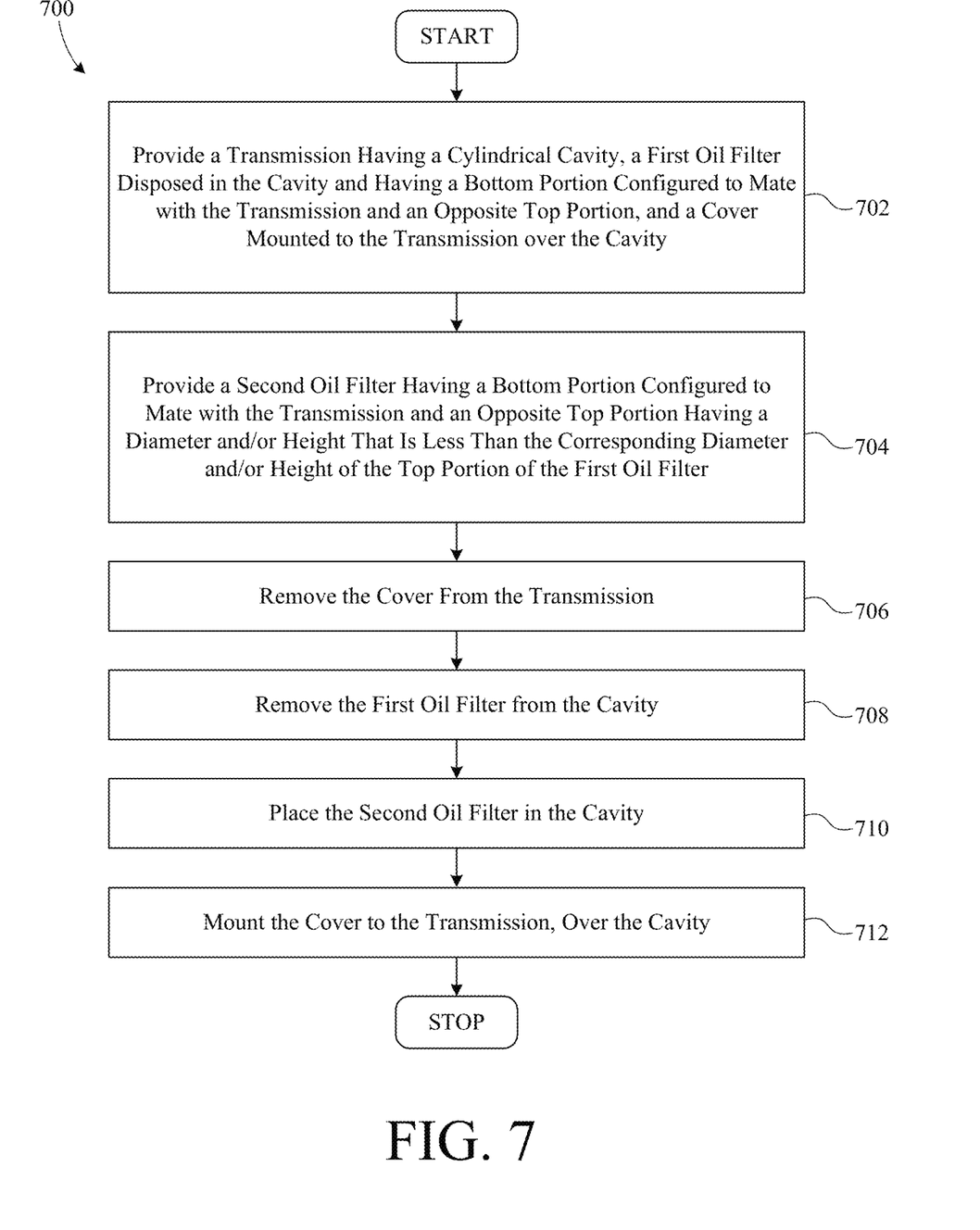
FIG. 7 is a flowchart summarizing a method for installing a transmission filter.

FIG. 7 is a flowchart summarizing a method 700 of installing a transmission filter. In a first step 702, a transmission having a cylindrical cavity, a first oil filter disposed in the cavity, and a cover mounted to the transmission, over the cylindrical cavity, are provided. The first oil filter includes a bottom portion and an opposite top portion. The bottom portion of the first oil filter is configured to mate with the transmission. Then, in a second step 704, a second oil filter having a bottom portion configured to mate with the transmission and an opposite top portion that has a smaller diameter and/or height than the top portion of the first oil filter is provided. Next, in a third step 706, the cover is removed from the transmission. Then, in a fourth step 708, the first oil filter is removed from the cavity. Next, in a fifth step 710, the second oil filter is placed in the cavity. Finally, in a sixth step 712, the cover is mounted to the transmission, over the cavity.

The description of particular embodiments of the present invention is now complete. Many of the described features may be substituted, altered or omitted without departing from the scope of the invention. For example, alternate transmission types, may be substituted for the CVT. As another example, the described filter cavity may be non-cylindrical, so long as the replacement filter is sufficiently different from the original filter to increase oil flow therethrough. These and other deviations from the particular embodiments shown will be apparent to those skilled in the art, particularly in view of the foregoing disclosure.

I claim:

1. A method for repairing a transmission, said method comprising:
   providing a transmission having
      a transmission housing having an interior wall defining a substantially cylindrical cavity and a fluid outlet, said cavity having a top portion and a bottom portion, said cavity being configured to receive an oil filter, said fluid outlet being disposed at said bottom portion of said cavity to provide a passage through which oil exits said cavity,
 a cover removably attached to said transmission housing over said top portion of said cavity, said cover defining a fluid inlet through which oil enters said top portion of said cavity, said transmission having a minimum fluid pressure requirement at said fluid output that increases with time;
 a first filter removably disposed in said cavity, said filter having a filter medium, a bottom portion, and a top portion, said top portion of said first filter and said wall of said cylindrical cavity defining therebetween a first fluid passage between said fluid inlet and said fluid outlet, said first fluid passage having a first cross-sectional area, such that said first filter provides a first initial output pressure at said fluid outlet when said first filter is in an uncontaminated state;
providing a second filter having a filter medium, a bottom portion, and a top portion, said bottom portion of said second filter including a bottom structure adapted to mate with said bottom portion of said cavity, said top portion of said second filter having a diameter less than the diameter of said top portion of said first filter;
removing said cover from said housing;
removing said first filter from said cavity;
installing said second filter in said cavity, said top portion of said second filter and said wall of said cylindrical cavity defining therebetween a second fluid passage between said fluid inlet and said fluid outlet, said second fluid passage having a second cross-sectional area greater than said first cross-sectional area, whereby said second filter provides a second initial output pressure at said fluid outlet when said second filter is in an uncontaminated state, said second initial output pressure being greater than said first initial output pressure so that said second filter has a greater life expectancy than said first filter; and
reattaching said cover to said transmission housing over said cavity.

2. The method of claim 1, wherein:
said filter medium of said second filter has a top portion and a bottom portion;
said top portion of said second filter includes a top structure attached to said top portion of said filter medium of said second filter;
said second filter further includes a rigid frame coupled between said bottom structure and said top structure, and
said rigid frame facilitates the passage of oil therethrough.

3. The method of claim 2, wherein said filter medium of said second filter is tapered to narrow from said bottom portion of said filter medium to said top portion of said filter medium.

4. The method of claim 3, wherein:
said filter medium of said second filter is formed from a pliable material;
said pliable material is folded into a corrugated configuration; and
said pliable material is shaped in a conical configuration.

5. The method of claim 2, wherein:
said bottom portion of said filter medium of said second filter is configured into a first cylinder having a first diameter;
said top portion of said filter medium of said second filter is configured into a second cylinder having a second diameter; and
said first diameter is greater than said second diameter.

6. The method of claim 5, wherein:
said bottom portion of said filter medium of said second filter is formed from a first section of pliable material that is folded into a corrugated configuration; and
said top portion of said filter medium of said second filter is formed from a second section of pliable material that is folded into corrugated configuration.

7. The method of claim 6, wherein:
said second filter further includes an annular plate having a top side, a bottom side, and an aperture passing through said top side of said annular plate and said bottom side of said annular plate;
a top of said bottom portion of said filter medium of said second filter is bonded to said bottom side of said annular plate; and
a bottom of said top portion of said filter medium of said second filter is bonded to said top side of said annular plate.

8. The method of claim 1, wherein said filter medium of said second filter is a rigid, porous structure.

9. The method of claim 1, wherein:
said bottom structure of said second filter includes a radial outer surface;
said radial outer surface of said bottom structure defines a channel;
said second filter further includes a resilient gasket seated in said channel;
said interior wall defining said bottom portion of said cylindrical cavity is adapted to urge against said resilient gasket to form a fluid barrier between said bottom structure of said second filter and said interior wall of said housing defining said cylindrical cavity.

10. The method of claim 1, wherein said transmission is a continuously variable transmission.

* * * * *